(12) United States Patent
Toillon

(10) Patent No.: US 6,289,024 B1
(45) Date of Patent: *Sep. 11, 2001

(54) STRUCTURE FOR THE CONNECTION OF A PLURALITY OF ELECTRONIC DEVICES TO AN ARINC 629 TYPE BUS

(75) Inventor: Patrice Toillon, Le Pecq (FR)

(73) Assignee: Sexant Avionique, Velizy Villacoublay (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,926

(22) Filed: Nov. 1, 1996

(30) Foreign Application Priority Data

Aug. 30, 1996 (FR) .................................. 96 10622

(51) Int. Cl.[7] .................................. H04L 12/413
(52) U.S. Cl. .......................................... 370/445
(58) Field of Search ................... 370/257, 433, 370/438, 451, 501, 502, 445, 447, 461, 462, 201, 289, 286, 364, 489; 379/406, 407, 410

(56) References Cited

U.S. PATENT DOCUMENTS

| | | | |
|---|---|---|---|
| 4,118,792 | * | 10/1978 | Struger et al. ......................... 714/43 |
| 4,627,052 | * | 12/1986 | Hoare et al. ............................ 370/88 |
| 5,398,243 | * | 3/1995 | Aguilhon et al. .................... 370/85.6 |
| 5,590,329 | * | 12/1996 | Goodnow, II et al. .................. 717/8 |
| 5,724,343 | * | 3/1998 | Pain et al. ............................. 370/438 |
| 5,740,174 | * | 4/1998 | Somer ................................... 370/402 |
| 5,745,493 | * | 4/1998 | St. Clair ............................... 370/438 |
| 5,802,077 | * | 9/1998 | Yeh ........................................ 371/36 |
| 5,805,828 | * | 9/1998 | Lee et al. ......................... 395/200.79 |
| 5,841,969 | * | 11/1998 | Fye ......................................... 714/56 |
| 5,954,810 | * | 9/1999 | Toillon et al. ....................... 710/129 |

FOREIGN PATENT DOCUMENTS 0 447 001    9/1991 (EP) .

OTHER PUBLICATIONS

Microprocessors and Microsystems, vol. 12, No. 1, Jan.–Feb. 1988, pp. 3–12, D. Bracknell, "Introduction to the MIL–STD–1553B Serial Multiplex Data Bus".
Scientific Honeyweller, vol. 11, No. 1, Jan. 1, 1991, pp. 57–70, Kenneth Hoyme, et al., "ARINC 629 and Safebus*: Data Buses for Commercial Aircraft".
Elektronik, vol. 37, No. 13, Jun. 24, 1988, pp. 84–88, Fred Uwe Prahm, "Verteilte Mess– Und Steuerungssysteme".
Elektor Electronics, vol. 20, No. 225, Sep. 1, 1994, pp. 64–68, Michael Rose, "EIB: European Installation Bus".
Patent Abstracts of Japan, vol. 012, No. 063, (E–585), Feb. 25, 1988, JP 62 206943, Sep. 11, 1987.

* cited by examiner

Primary Examiner—Ajit Patel
Assistant Examiner—Hanh Nguyen
(74) Attorney, Agent, or Firm—Oblon, Spivak, McClelland, Maier & Neustadt, P.C.

(57) ABSTRACT

A structure to connect a plurality of electronic devices to an ARINC type external bus including a local bus with a sufficiently small length to overcome a phenomena of attenuation and propagation time, a connection channel for connection to the local bus for each of the devices located in one and the same zone, and at least one connection channel for the connection of the local bus to the external bus.

36 Claims, 7 Drawing Sheets

STRUCTURE FOR THE CONNECTION OF A PLURALITY OF ELECTRONIC DEVICES TO AN ARINC 629 TYPE BUS

BACKGROUND OF THE INVENTION

1. Field of the Invention

The present invention relates to a structure for the connection of a plurality of electronic dievices to an ARINC (Aeronautical Radio, Inc.) type bus.

It can be applied especially but not exclusively to electronic devices installed on aerodynes that communicate with one another by means of one or more buses that meet the ARINC 629 standard.

2. Description of the Prior Art

According to this standard, as shown in FIG. 1, the electronic devices Ei are connected to a main cable 1, or aircraft cable, by means of a stub or <<dual descent>>cable 13 that is connected to the main cable 1 by means of a simultaneously two-way coupler 5 of the non-intrusive, inductive type. This coupler provides for the conversion between the voltage dipoles circulating in the stub and the current dipoles circulating in the main cable. This topology allows for distances in the range of 100 meters between the devices and enables the connection of a maximum of 120 devices.

The main cable 1 constituting the bus is used in multiplexed multi-transmitter mode so that the information elements circulating in the bus are transmitted by only one device at a time and then distributed to the other devices connected to the bus. The transmitted information elements are monitored in real time by the transmitting device which does so by means of the information elements that are restored through the connection of this device to the bus.

The stub 13 is formed by a dual twisted pair, i.e. one pair for the transmission channel 4 and one pair for the reception channel 3 thus enabling simultaneous transmission and reception on the stub and hence real-time monitoring of transmission. It is controlled in the device Ei by an SIM 629 serial interface module providing for the physical interface between the stub and the TC 629 function or terminal controller function of the device. This function controls the transmission and reception of messages of the sub-system that uses the equipment.

The fact is that the field in which collisions occur, namely the zone in which signals coming from different devices may be present simultaneously, corresponds to the entire main cable. Major distances and therefore major disparities (in terms of attenuation, parasitic phenomena and propagation time) on the signals therefore have to be processed in the SIMs or serial interface modules of each device. Furthermore, this detection must be done as swiftly as possible and with the best possible coverage so as to make the communications system rapidly available for the other devices.

The result thereof is that the main cable must have low attenuation, controlled impedance with low tolerance (2%) throughout its length as well as very precise matching (4%), given that all the passive elements of the physical layer should not induce false physical information in the form of parasitic reflections which will then have to be processed by the devices.

Furthermore, the SIM of each device must be capable of monitoring and adapting to variable levels of signals in reception, with the need to distinguish between, on the one hand, accurate physical information during transmission, hence high-level information, and physical information that is transmitted remotely and is therefore at a level that is attenuated and, on the other hand, information coming from instances of collision.

In the current approach, the elements of the physical layer, namely the main cable, the SIM of each equipment as well as the stub and the connection coupler of each device are very costly. This is because of the very narrow tolerance required for the physical characteristics of the passive components and because of the need to ascertain that the signals received come within the complex-shaped templates that differ according to whether the operation relates to reception for the control of a local transmission or to the reception of a remote transmission.

Furthermore, the detection of collision for which the SIM is responsible is done in a complex way by means of a very precise analysis of the amplitude of the signal received at specific instants, the width of the pulses and the intervals between the pulses.

SUMMARY OF THE INVENTION

The present invention is aimed at overcoming these drawbacks, working on the basis of the observation that the electronic devices are not distributed uniformly along the aircraft bus but are grouped together in well demarcated zones, the major part of the devices being positioned in the aircraft rack beneath the cockpit To this end, there is proposed a structure for the connection of a plurality of electronic devices enabling communications to be set up among these devices as well as between these devices and an ARINC type external bus.

According to the invention, this structure comprises:
  a local bus with a sufficiently small length to overcome attenuation phenomena,
  a connection channel to the local bus for each of the devices located in one and the same zone, and
  at least one channel for the connection of the local bus to the external bus.

By using several of these structures that are series-connected by external bus sections, there is obtained a segmented topology capable of taking a form that can equally well be linear or meshed.

The devices are connected to a structure according to the invention by means of a simplified SIM as well as a stub.

Furthermore, since the length of the local bus is small, the attenuation of the signals in transmission and in reception is constant within the structure and does not fluctuate as a function of the relative position of the devices on the bus. All the devices connected to the structure therefore perceive only one signal level whatever may be the position of the transmitter device along the local bus.

Since the levels of the signals travelling through the local bus are constant, it is no longer necessary to make a precise analysis of these signals to ascertain that the bus is active and find out whether these signals correspond to accurate transmission, collision or parasites. Since the local bus has a very small length, all the devices connected to the structure according to the invention are capable of observing the activity of the other devices simultaneously: a simple local detection is sufficient to detect this activity.

Thus, the connection channel of each of the devices advantageously includes logic means for the detection of a transmission made by the device. These logic means deliver a detection signal that is sent to the other connection channels of the structure according to the invention.

In this way, the detection of collisions, namely of simultaneous attempts at transmission, is reduced to the detection of the presence, in logic terms, of activity on the other connection channels.

Thus, the detection of collision in terms of the physical consequences of this collision is converted into the detection of collision in terms of its very definition.

These arrangements enable a substantial simplification of the SIM of the devices and the use of an external bus with less restrictive characteristics.

BRIEF DESCRIPTION OF THE DRAWINGS

An embodiment of the structure according to the invention shall be described hereinafter by way of a non-restrictive example with reference to the appended drawings, of which.

MORE DETAILED DESCRIPTION

Figure 1:
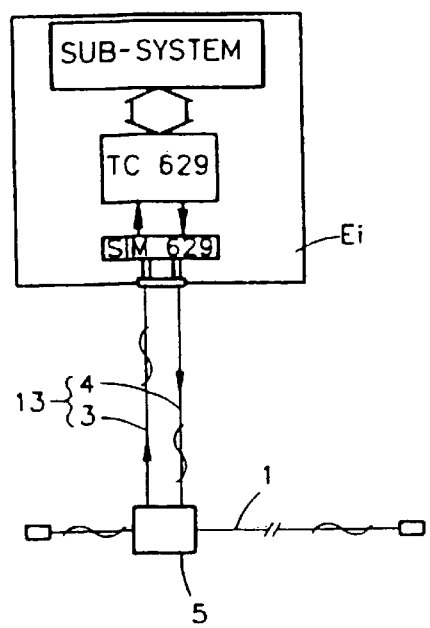
FIGS. 1 and 2 illustrate the mode of connection of an device respectively with an ARINC bus 629 according to the prior art and with a connection structure according to the invention.
Figure 2:
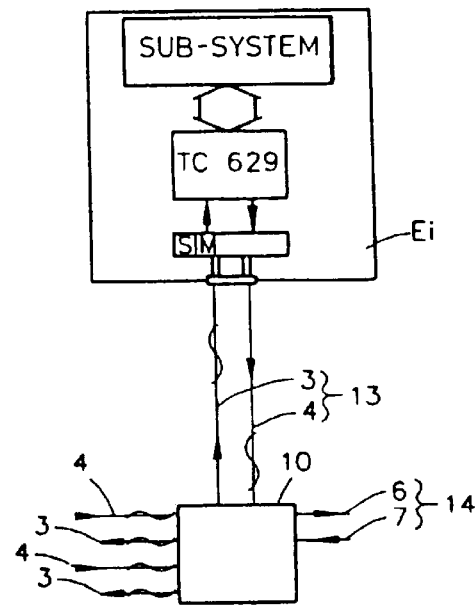

FIG. 2 shows the mode of connection of a device Ei to the connection structure 10 according to the invention. The connection structure 10 has a plurality of connectors for stubs 13 with a dual twisted pair 3, 4 of the type shown in FIG. 1, so that it can get connected to a plurality of devices Ei. This structure 10 also has one channel in transmission and in reception, 6, 7, per external bus 14. Each device Ei, as in FIG. 1, has a user sub-system that sends and receives messages by means of a control unit or terminal controller TC 629 and an interface module SIM with a simplified structure as compared with the one required by the ARINC 629 standard.

Figure 3:
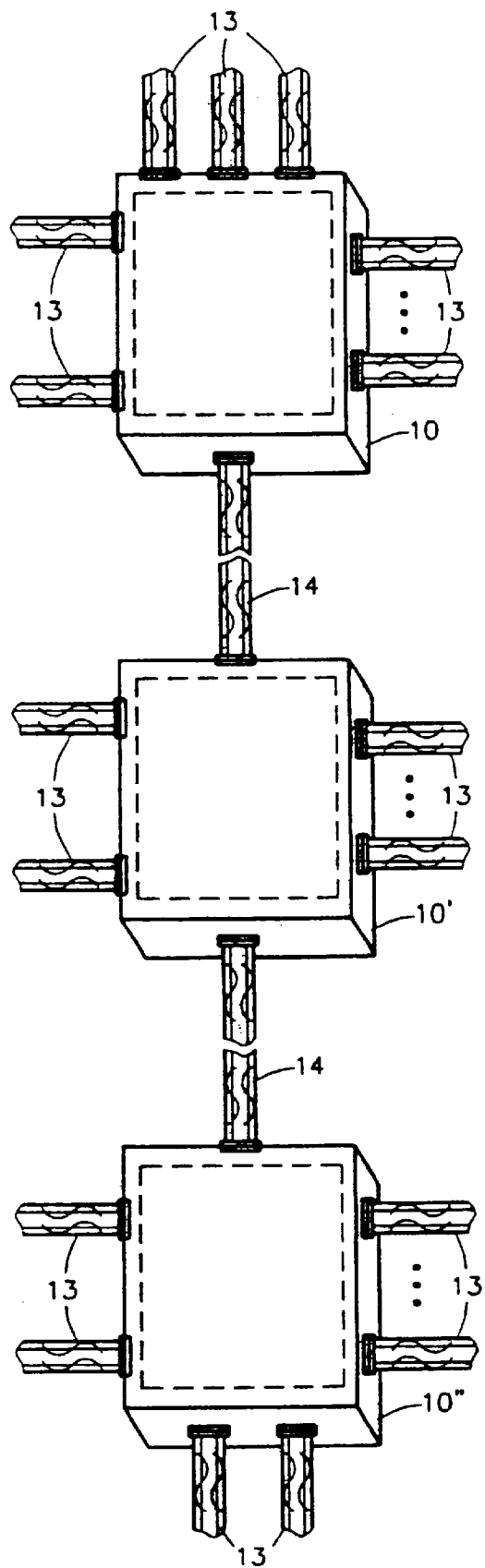
FIG. 3 shows several structures according to the invention interconnected in series.

FIG. 3 shows three connection structures 10, 10', 10" series-connected by two external bus sections 14 constituted for example by a dual twisted pair or again by an optical fiber. Each connection structure 10, 10', 10" has a multiplicity of stub 13 connection points enabling the connection of electronic devices that have to communicate with one another.

The connection structure 10 takes the form of a closed pack 11 (see FIG. 4) made of a material that shields the internal circuits against electromagnetic radiation and lightning. The wall of the pack 11 is used as a mechanical support for the connectors of the devices and the external buses. The shape and the dimensions of these connectors are chosen so as to enable the greatest possible reduction of the size and weight of the pack and provide for the electrical continuity of the peripheral sheathing of the stubs with the devices.

Figure 4:
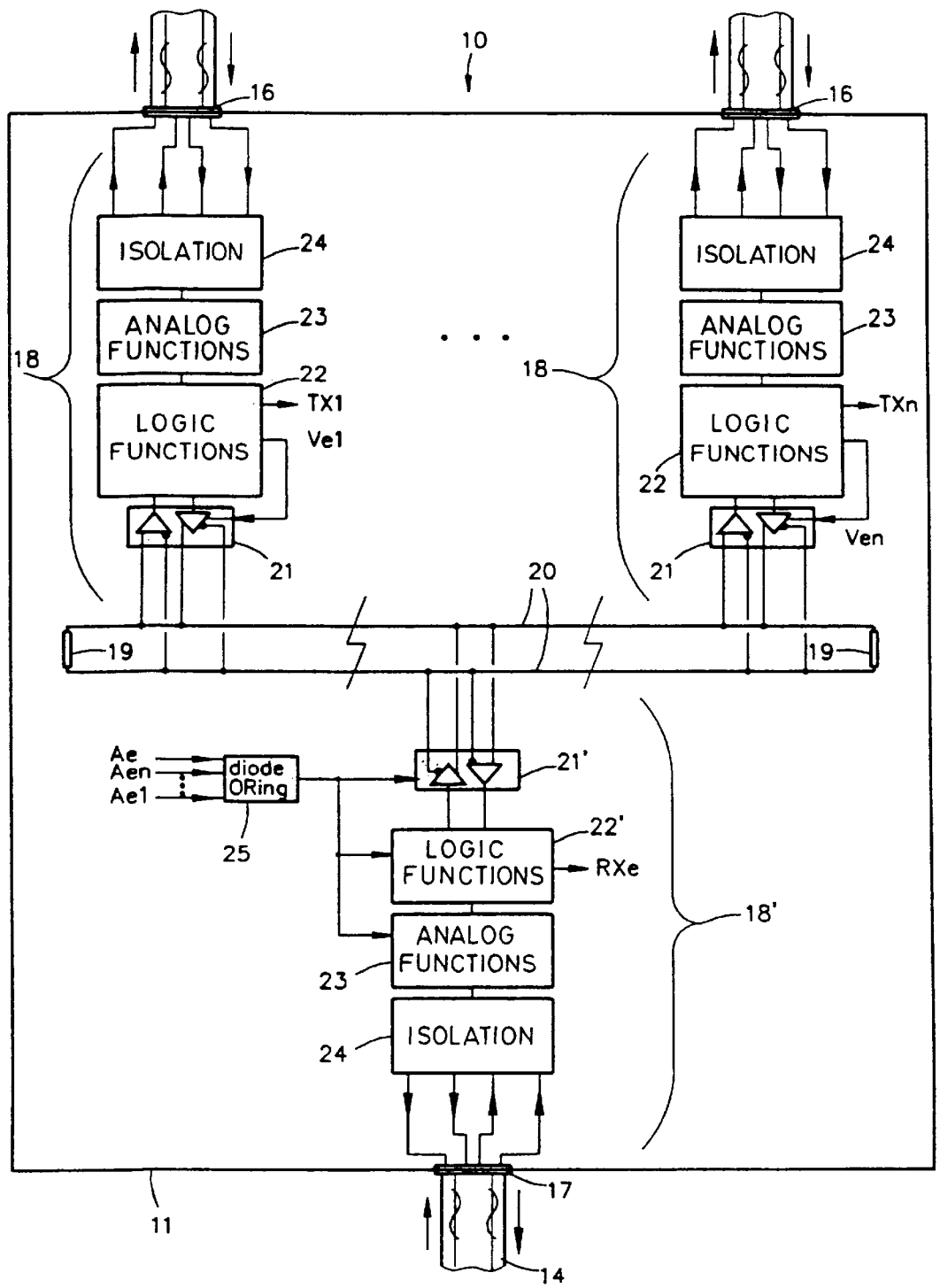
FIG. 4 shows the internal architecture of the connection structure.

Within the pack 11 shown in FIG. 4, each connector 16, 17 is connected to a connection channel 18, 18' that is electrically and physically separated from the other channels to the maximum extent. At least one connection channel 18' is connected to a connector 17 at an external bus 14. Thus, for example, the electrical supply of the structure is not provided by a general supply but in common mode by each of the devices by means of their respective SIMs.

The system can also be designed so that the connection structure will have a modular structure with N independent channels so as to further increase the separation between the channels.

All the connection channels 18, 18' are interconnected by a local bus 20 consisting for example of an RS 485 type dual serial line with a small length, for example equal to less than 10 cm, so as to overcome problems due to propagation time and on-line signal attenuation. The mutually facing ends of two serial lines are connected respectively to each other by two respective matching resistors 19 so as to eliminate the reflections from the signals at the ends of the line.

According to the RS 485 standard, a bus of this kind enables a maximum of 32 connections. The connection structure 10 can then include up to 32 channels referenced 18, 18'.

Each connection channel 18, 18' comprises:
  an RS 485 type transmitter/receiver stage 21, 21' comprising a transmitter supplied by the device Ei and a receiver, both of these elements being connected directly to the two lines of the local bus 20,
  a logic stage 22, 22' combining the logic functions of the channel, this logic stage 22, 22' being connected to the transmitter and to the receiver of the transmitter/receiver stage 21, 21',
  an analog stage 23 combining the analog functions of the channel, this analog stage 23 being connected to the logic stage 23, 23', and
  an isolating stage 24 providing for electrical isolation between the device Ei and the analog stage 23.

The logic stage 22 of each connection channel 18 of a device Ei sends out a validation signal Vei that is applied to the transmitter of the transmitter/receiver stage 21 to authorize or not authorize transmission on the local bus 20.

Furthermore, the resources of the channel 18' connected to the external bus 14 are supplied either by one of the devices Ei or by the external bus 14 by means of an OR gate 25 consisting for example of a set of diodes referenced ORing, to the input of which there are applied all the supply voltages Aei, Ae given by all the channels (18, 18').

Figure 5:
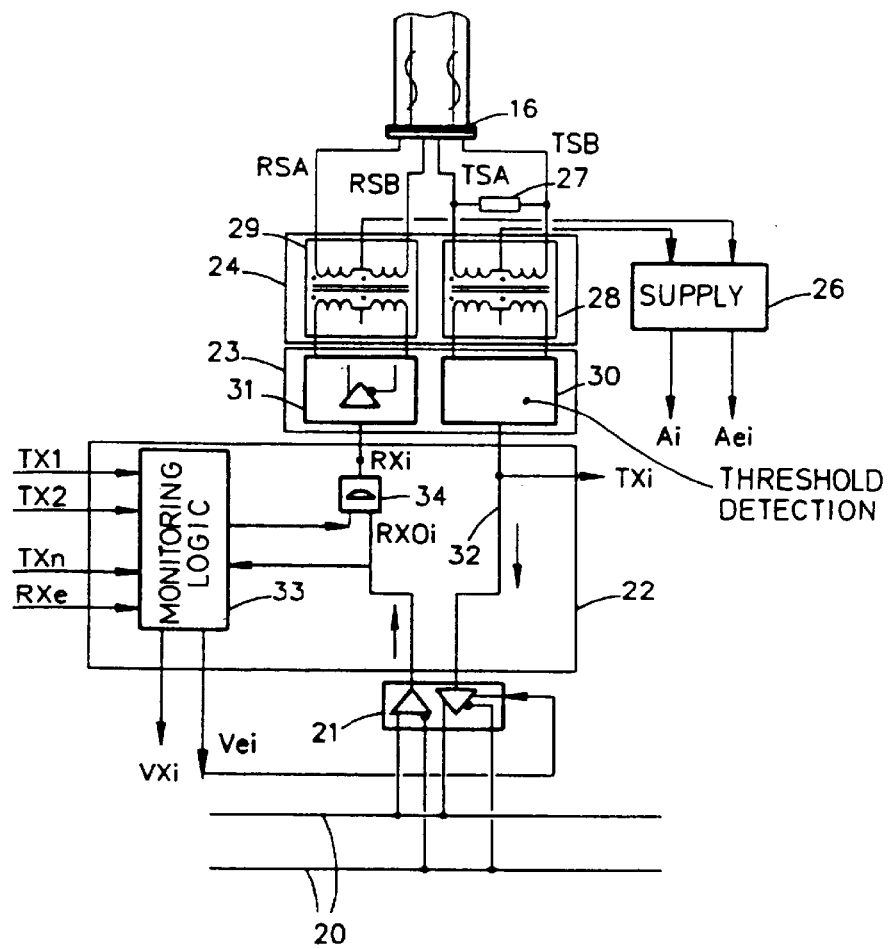
FIG. 5 shows a detailed view of a connection channel of the connection structure.

In FIG. 5, the isolating stage 24 consists of two transformers with a transformer ratio 1. One of these transformers, referenced 28, is connected to the transmission channel TSA, TSB of the device Ei and the other transformer, referenced 29, is connected to the reception channel RSA, RSB. The two transmission lines TSA and TSB are connected to each other by a resistor 27. The midpoints of the windings of the transformers 28, 29 connected to the connector 16 are connected to a power supply unit 26 that extracts a DC voltage from the signals circulating either in the transmission differential lines TSA, TSB or in the reception differential lines RSA, RSB. This power supply unit 26 distributes this DC voltage between a supply line Ai of the channel 18 and a supply line Ae of the external channel 18'. Thus, the signals TSA, TSB, RSA and RSB delivered by the SIM of the device Ei ought to provide for the supply of the local channel 18, the external channel 18' as well as the external bus 14.

As regards the channel 18' for connection to an external bus 14, the supply unit 26 extracts the DC voltage from the signals transmitted by the external bus and delivers only one DC voltage Ae.

The analog stage 23 has, in transmission, a threshold detector 30 that converts the differential signals TSA, TSB into a logic signal TXi and a differential analog signal generating unit 31 that converts the logic signal RXi transmitted by the logic stage 22, 22' into differential signals RSA, RSB.

The logic stage 22 of the channels 18 connected to the devices comprises:

- a serial link 32 that transmits the logic signal TXi coming from the threshold detector 30 to the transmitter of the transmitter/receiver stage 21,
- a monitoring logic stage 33 that receives all the signals TXi from all the channels of the connection structure 10 as well as the signal RXe transmitted by the channel 18 connected to the external bus and the signal RXOi transmitted by the receiver of the transmitter/receiver stage 21, and delivers a validation signal, and
- a logic AND gate 34 that receives, as inputs, the signal RXOi and the validation signal coming from the logic circuit 33 and that delivers the signal RXi applied as an input to the generating unit 31 of the analog stage 33.

The logic circuit 33 also delivers a validation signal Vei to validate the transmission carried out by the transmitter of the transmitter/receiver stage 21 and a signal Vxi to validate transmission on the external bus.

Figure 6:
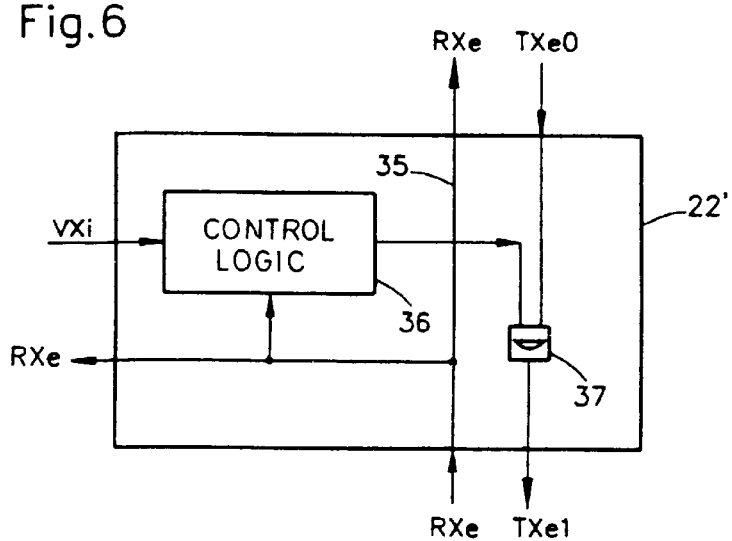
FIG. 6 shows a view in greater detail of an element for the connection of the external bus to the local bus of the connection structure.

FIG. 6 shows the logic stage 22' of the channel 18' connected to the external bus. This stage comprises:

- a serial link 35 that transmits the logic signal RXe coming from the threshold detector 30 of the channel 18' to the transmitter of the transmitter/receiver stage 21',
- a transmission control logic circuit 36 that receives the signal Rxe and all the signals Vxi generated by the logic circuit 33 and delivers a validation signal to validate the signal TXe to be transmitted to the external bus, and
- a logic AND gate 37 that receives, as an input, the signal TXe0 transmitted by the receiver of the transmitter/receiver stage 21' and the validation signal coming from the logic circuit 36, and delivers the signal TXe1 corresponding to the validated signal Txe0, that is applied, as an input, to the generating unit 31 of the analog stage 23 of the channel 18'.

In fact, the logic gate 36 can be used to prevent the signals transmitted by the external bus from being re-transmitted to this bus so as to avert any echo phenomenon. Thus, this circuit limits its task as follows: it validate transmission to the external bus only when, according to the signal RXe, the external bus is inactive or when, according to the signals Vxi, the local bus is active.

Figure 7:
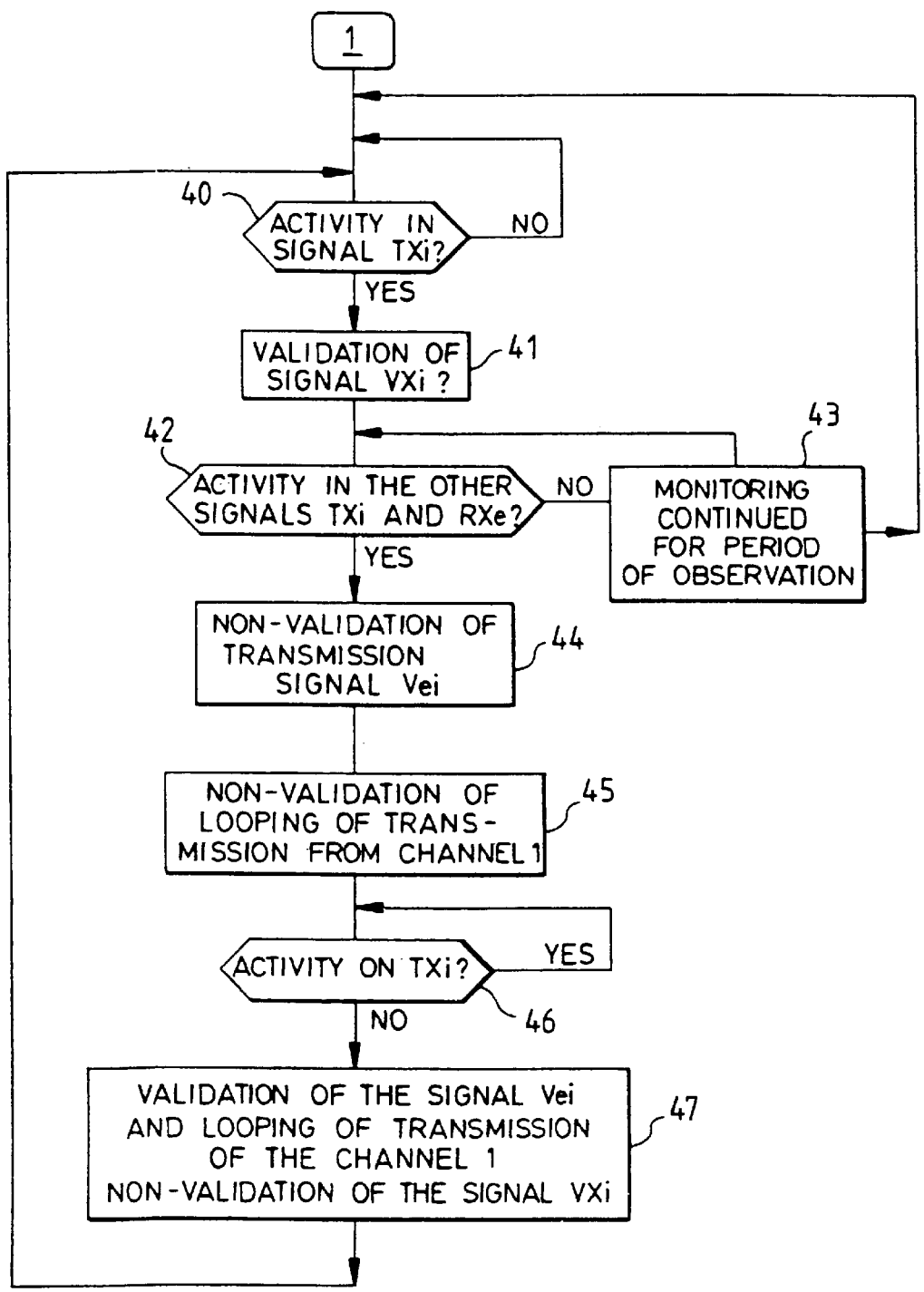
FIGS. 7 and 8 illustrate an algorithm performed by one of the functions of the connection structure.
Figure 8:
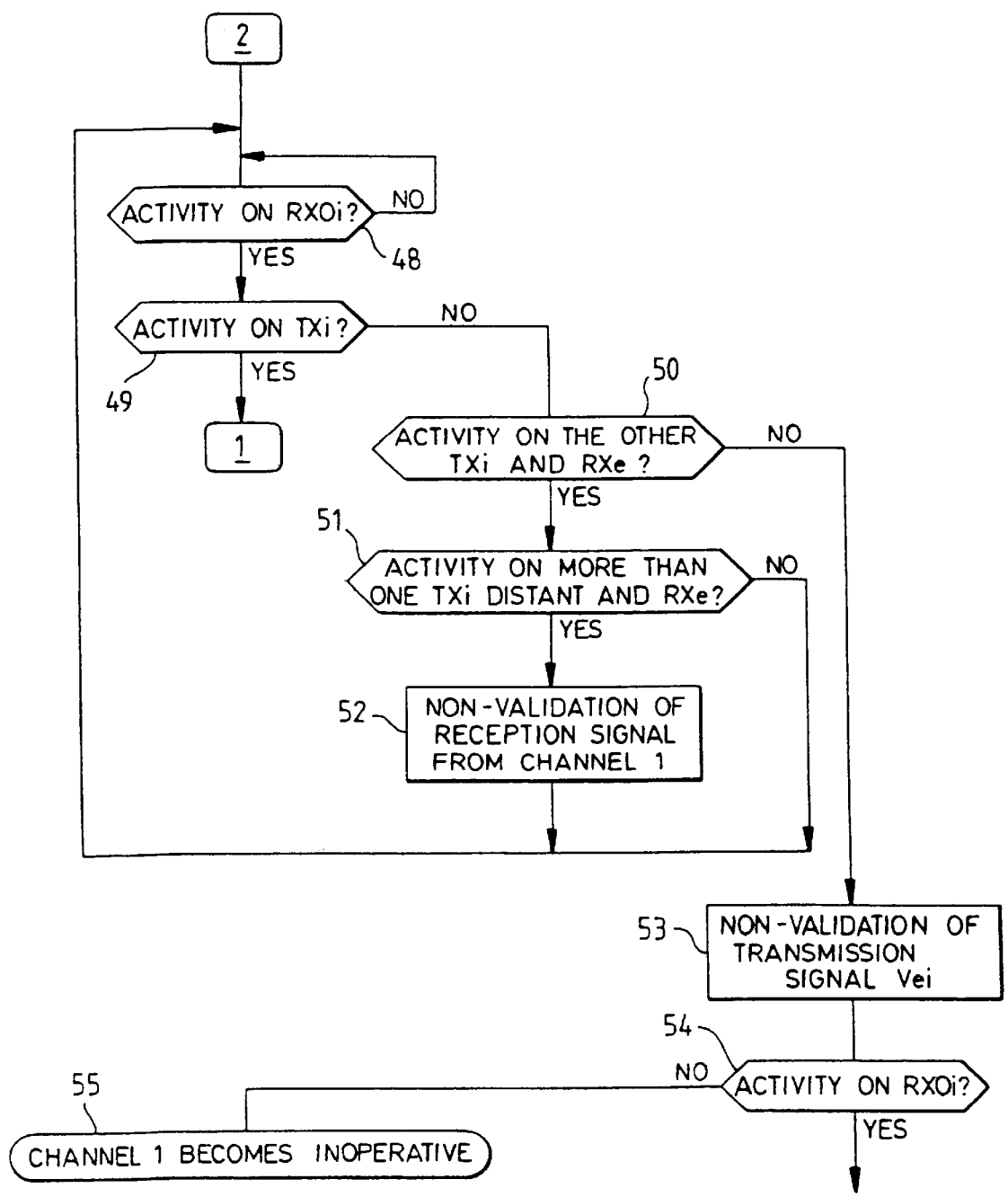

FIGS. 7 and 8 illustrate the algorithm performed by the monitoring logic circuit 33. This algorithm comprises a first monitoring loop shown in FIG. 7 that relates to the signal TXi coming from the threshold detector 30.

At the first step 40 of this loop, the logic circuit 33 examines the signal TXi in order to detect therein activity corresponding to transmission activated by the device Ei.

When activity of this kind is detected, the logic circuit 33 validates the signal Vxi (step 41) and examines the signals TXi and RXe transmitted by the other channels 18, 18' (step 42). If activity is detected, indicating that the local bus 20 is being used, there then exists a situation of collision and the logic circuit 33 goes to the step 44. If not, the monitoring of the activity of the bus 20 is continued for a certain period of time T of observation and if, during this period, no activity on the bus 20 is detected, then the logic circuit 33 recommences the performance of the loop at the step 40 (step 43).

At the step 44, there is a situation of collision on the local bus 20 and the logic circuit 33 does not send the signal Vei. This deactivates the transmitter of the transmitter/receiver stage 21 and does not validate the signal RXOi which corresponds to the signal TXi that is applied to the local bus 20 and re-read by the receiver of the transmitter/receiver stage 21 (step 45). This operation therefore prevents a return, to the SIM of the device Ei, of the signal sent out by this device. This is interpreted, by the module of the TC 629 control unit or terminal controller as an erroneous transmission. The TC 629 will therefore stop the transmission in progress.

At the step 46, the logic circuit 33 awaits the stopping of this transmission by again monitoring the signal TXi. Then, by means of the signal Vei, this logic circuit 33 releases the transmitter of the transmitter/receiver stage 21 and sends out the validation signal Vxi as well as a signal to validate the signal RXOi (step 47) before returning to the step 40.

The second loop of the algorithm (FIG. 8) pertains to the monitoring of the signal RXOi coming from the local bus 20.

At the first step 48 of this loop, the logic circuit 33 awaits activity on this signal and, when activity is detected, the logic circuit 33 tests the activity at the level of the signal TXi (step 49). If activity is detected, the logic circuit 33 goes to the step 40 of the first loop. If not, the logic circuit 33 tests the activity at the level of the signals TXi and RXe of the other channels 18, 18' (step 50). If activity is detected and if more than one channel is active (step 51), which is a situation corresponding to a case of collision among several other channels, the logic circuit 33 then sends a signal towards the AND gate 34 to invalidate the signal RXOi coming from the local bus 20 (step 52) and returns to the step 48.

Furthermore, if no collision is detected at the step 51, the system is then in mode of reception from the local bus 20, and the logic circuit 33 returns to the step 48.

If, at the step 50, all the other channels 18, 18' are inactive, the signal RXOi received corresponds to a parasitic signal and the logic circuit 33 does not send out the signal Vei that deactivates the transmitter of the transmitter/receiver stage 21 (step 53). If, in this state, activity continues to be observed on the signal RXOi, the parasitic signals have come from another channel. Otherwise they have come from the stage 21 and the channel i is then considered to be malfunctioning and is deactivated (step 55).

Figure 9:
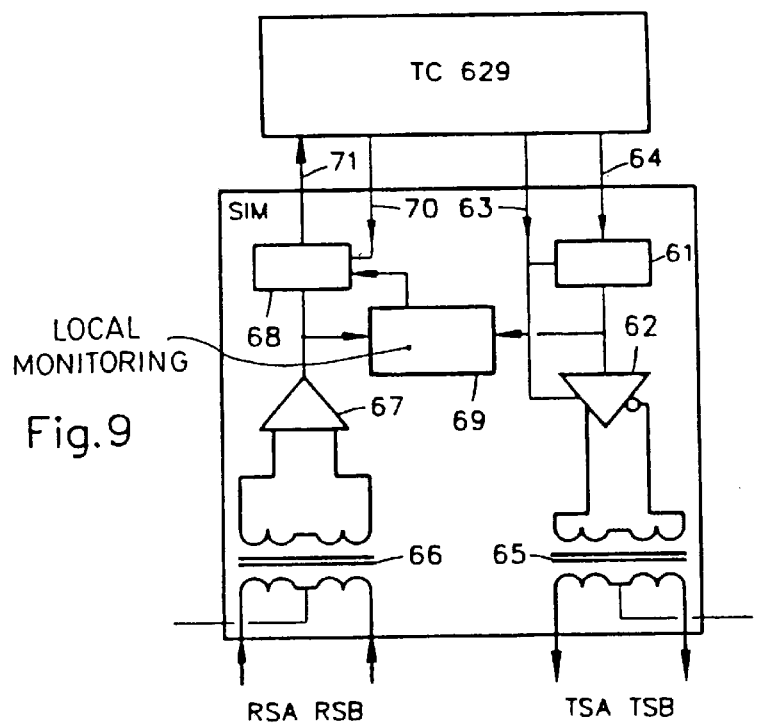
FIG. 9 gives a schematic view of a serial interface module or SIM of a device connected to the connection structure.

FIG. 9 shows the SIM that is to be integrated into each device Ei connected to the connection structure 10. This module is greatly simplified with respect to the SIM 629 module used in the approach according to the prior art. The SIM is connected firstly to a TC 629 terminal controller and secondly to the stub that gets connected to the structure 10. It comprises:

- an input stage 61 that receives the Manchester-type logic signals 64 of the data elements to be transmitted and a transmission validation signal 63 transmitted by the TC 629 terminal controller,
- a differential signal generating unit 62 also steered by the transmission validation signal coming from the TC 629 terminal controller, the differential output of which is applied to a first isolating transformer 65 that delivers the differential signals TSA and TSB,
- a second isolating transformer 66 that receives the differential signals RSA and RSB and transmits them to a differential reception stage 67, a logic reception circuit 68 that receives the output of the differential reception stage 67 and converts the signals received into Manchester-type complementary signals that are applied to the input 71 of the TC 629 terminal controller.

Furthermore, the reception logic circuit 68 receives a reception validation signal 70 from the TC 629 terminal controller. This circuit 68 is controlled by a local monitoring unit 69 which, in the case of transmission, compares the transmitted signals with the received signals by counting and comparing the number of transitions in each of these signals and, if a difference is detected, it deactivates the logic reception circuit 68.

It must be noted that the function of looping the transmission to the transmitter, stipulated by the ARINC 629 standard, is done at each channel of the structure. The loop is therefore a local loop. It is also possible to envisage a structure in which the loop function also uses the channel 18' connected to the external bus, thus enabling the checking of each transmission on the external bus.

Figure 10:
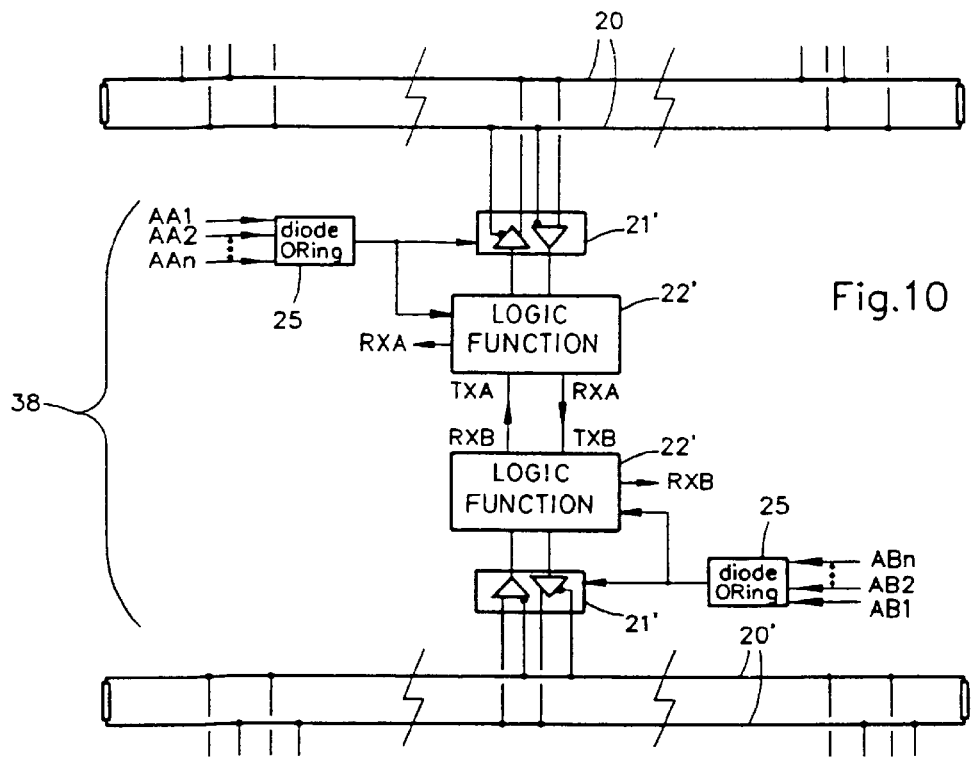
FIGS. 10 and 11 show two variants of performance of the connection structure.

If it is desired to make a connection structure 10 comprising more channels than the 32 channels permitted by the RS 485 standard, a second local bus 20' can be added to this structure 10, as shown in FIG. 10. It is then necessary for the two buses 20, 20' to be coupled to each other so as to appear as a single bus for all the devices Ei that are connected to the structure 10.

Thus, in FIG. 10, the two local buses 20, 20' are interconnected by means of a repeater 38 comprising two transmitter/receiver stages 21', respectively connected to the local bus, and two logic stages 22' respectively connected to the two transmitter/receiver stages 21' such as those used in the connection channel 18' of an external bus.

The two logic stages 22' are interconnected so that the output TX of one of them is applied to the input RX of the other.

Furthermore, the transmitter/receiver stages 21' and the logic stages 22' are each supplied like the stage 21' of the channel 18' by means of a set of diodes ORing 25 to the input of which there are applied the DC voltages delivered by the channels 18, 18' connected to the corresponding local bus. The signals RXA and RXB delivered by the two logic stages 22' are applied to the input of the logic stages 22' of the channels connected to the other bus.

Figure 11:
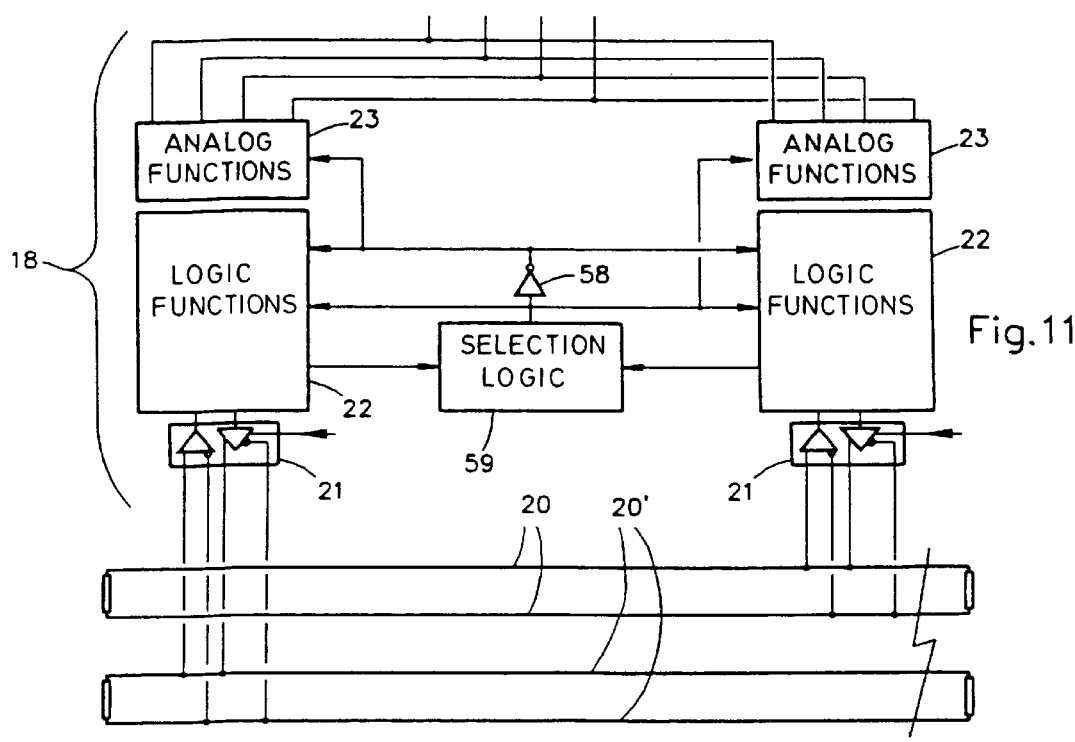

It is also possible to provide for a redundant variant of the connection structure 10 as shown in FIG. 11 so as to increase its availability.

This figure gives a detailed view of the structure of a channel 18 connected, on the one hand, to the device and, on the other hand, to two redundant local buses 20, 20'.

Each channel 18 has two redundant analog stages 23 connected to a single isolating stage 24 (not shown in this Figure). Each analog stage 23 is connected to a respective logic stage 22, each logic stage 22 being connected to a respective local bus 20, 20' by means of a respective transmitter/receiver stage 21.

The two logic stages 22 of each channel 18 carry out their own detection of malfunction and apply an error detection signal to the input of a consolidation logic circuit 59 that finalizes the choice made by the logic stages 22. This choice is monitored by looping by these logic stages and is applied directly and by means of an inverter 58 respectively to the two analog stages 23 so as to obtain the exclusive validation of one of the respective reception channels.

Furthermore, the logic stages 22 also exchange the signals RX that are applied, as inputs, to the logic monitoring circuit 33 of the other logic stage 22.

Thus, in normal operation, the local buses 20 and 20' transmit the same signals coming from the devices Ei connected to the structure 10.

The connection channel 18' for connection to an external bus can be made similarly to the channels 18. It is also possible to provide for two redundant external buses. In this case, the connection structure will have two channels 18' that are connected to only one respective local bus and to only one respective external bus.

What is claimed is:

1. A structure for the connection of a plurality of electronic devices to an ARINC (Aeronautical Radio, Inc.) type external bus, said structure comprising:

a local bus having a length less than or equal to 10 cm to overcome a phenomena of attenuation and propagation time;

a bidirectional connection channel for connecting each of the electronic devices located in one and the same zone to the local bus; and at least one connection channel for connecting the local bus to the external bus, wherein each connection channel of the electronic devices comprises means for permitting transmission on the local bus only when all other connection channels of the structure are inactive, wherein each connection channel of the structure comprises means for broadcasting information received thereon to all other connection channels of the structure without memorization and without internal frame information filtering, and wherein the plurality of electronic devices connected to the structure share the same collision domain.

2. A structure according to claim 1, wherein said each connection channel comprises logic means for the detection of transmission carried by the device, and for delivering a detection signal that is sent to other connection channels of the connection structure.

3. A structure according to claim 1, further comprising:

a closed pack including a material that shields internal circuits against electromagnetic radiation and lightning, wherein walls of the pack comprise a mechanical support for a plurality of connectors to connect devices and external buses, a shape and dimensions of said connectors being chosen so as to enable a greatest possible reduction of size and weight of the pack while at the same time providing for electrical continuity of a peripheral sheathing of stubs with the devices.

4. A structure according to claim 1, wherein said each connection channel comprises means for monitoring an activity of the local bus and for permitting a reception of signals transmitted by the local bus, solely if only one other connection channel is active or if the channel is in the process of transmission to the local bus.

5. A structure according to claim 1, wherein said each connection channel is electrically separated from one another, outside the local bus, and an electrical supply of said each connection channel being provided in common mode by a device that is connected to it.

6. A structure according to claim 1, wherein the structure includes a modular structure with several independent connection channels.

7. A structure according to claim 1, wherein the local bus includes an RS 485 type double serial line.

8. A structure according to claim 1, wherein said each connection channel comprises:

a transmitter/receiver stage that is supplied by the device and is connected directly to the local bus, a logic stage that combines logic functions of the channel and is connected to the transmitter/receiver stage, an analog stage that combines analog functions of the channel and is connected to the logic stage, and an isolating stage providing for electrical isolation between the electronic device and the analog stage.

9. A structure according to claim 8, wherein the logic stage of each bidirectional connection channel sends out a validation signal Vei that is applied to the transmitter of the transmitter/receiver stage to authorize or not authorize transmission on the local bus.

10. A structure according to claim 8, wherein the logic stage of the connection channel for connection to the external bus comprises means for preventing signals transmitted by the external bus from being re-transmitted to the external bus, so as to avert any echo phenomenon.

11. A structure according to claim 9, wherein each bidirectional connection channel comprises two redundant analog stages connected to a single isolating stage, each analog stage being connected to a respective logic stage, and each logic stage being connected to a respective local bus by a respective transmitter/receiver stage.

12. A structure according to claim 11, wherein the structure is connected to two redundant external buses, by two respective connection channels connected respectively to the two local buses.

13. A structure according to claim 11, wherein the structure is connected to an external bus by a connection channel comprising two redundant analog stages connected to a single isolating stage, each analog stage being connected to a respective logic stage, and each logic stage being connected to a respective local bus by means of a respective transmitter/receiver stage.

14. A structure according to claim 1, wherein the connection channel for connection with the external bus is supplied either by one of the devices or by the external bus by a set of diodes associated in an OR gate, to the input of which there are applied all the supply voltages given by the channels.

15. A structure according to claim 1, wherein the signals exchanged with the device enable the supply of the bidirectional connection channel, the at least one connection channel, and the external bus.

16. A structure according to claim 1, wherein each bidirectional connection channel comprises means for simultaneously receiving signals that it has just transmitted on the local bus.

17. A structure according to claim 1, comprising a second local bus coupled to the first local bus, by a repeater so as to appear as a single local bus for all the connection channels of the connection structure.

18. A structure for the connection of a plurality of electronic devices to an ARINC (Aeronautical Radio, Inc.) type external bus, said structure comprising:

a local bus having a length less than or equal to 10 cm to overcome a phenomena of attenuation and propagation time;

a bidirectional connection channel configured to connect each of the devices located in one and the same zone to the local bus; and at least one connection channel configured to connect the local bus to the external bus, wherein each connection channel of the electronic devices comprises a mechanism configured to permit transmission on the local bus only when all other connection channels of the structure are inactive, wherein each connection channel of the structure comprises a mechanism configured to broadcast information received thereon to all other connection channels of the structure without memorization and without internal frame information filtering, and wherein the plurality of electronic devices connected to the structure share the same collision domain.

19. A structure according to claim 18, wherein said each connection channel comprises a logic circuit configured to detect a transmission carried by the device, and configured to deliver a detection signal that is sent to other connection channels of the connection structure.

20. A structure according to claim 18, further comprising:

a closed pack including a material that shields internal circuits against electromagnetic radiation and lightning, wherein walls of the pack comprise a mechanical support for a plurality of connectors to connect devices and external buses, a shape and dimensions of said connectors being chosen so as to enable a greatest possible reduction of size and weight of the pack while at the same time providing for electrical continuity of a peripheral sheathing of stubs with the devices.

21. A structure according to claim 18, wherein said each connection channel comprises a monitoring stage configured to monitor an activity of the local bus and permit a reception of signals transmitted by the local bus, solely if only one other connection channel is active or if the channel is in the process of transmission to the local bus.

22. A structure according to claim 18, wherein said each connection channel is electrically separated from one another, outside the local bus, and an electrical supply of said each connection channel being provided in common mode by a device that is connected to it.

23. A structure according to claim 18, wherein the structure includes a modular structure with several independent connection channels.

24. A structure according to claim 1, wherein the local bus includes an RS 485 type double serial line.

25. A structure according to claim 18, wherein said each connection channel comprises:

a transmitter/receiver stage that is supplied by the device and is connected directly to the local bus, a logic stage that combines logic functions of the channel and is connected to the transmitter/receiver stage, an analog stage that combines analog functions of the channel and is connected to the logic stage, and an isolating stage providing for electrical isolation between the electronic device and the analog stage.

26. A structure according to claim 25, wherein the logic stage of each bidirectional connection channel sends out a validation signal Vei that is applied to the transmitter of the transmitter/receiver stage to authorize or not authorize transmission on the local bus.

27. A structure according to claim 26, wherein each bidirectional connection channel comprises two redundant analog stages connected to a single isolating stage, each analog stage being connected to a respective logic stage, and each logic stage being connected to a respective local bus by a respective transmitter/receiver stage.

28. A structure according to claim 27 wherein the structure is connected to two redundant external buses, by two respective connection channels connected respectively to the two local buses.

29. A structure according to claim 27, wherein the structure is connected to an external bus by a connection channel comprising two redundant analog stages connected to a single isolating stage, each analog stage being connected to a respective logic stage, and each logic stage being connected to a respective local bus by means of a respective transmitter/receiver stage.

30. A structure according to claim 25, wherein the logic stage of the connection channel for connection to the external bus comprises a logical gate configured to prevent the signals transmitted by the external bus from being re-transmitted to the external bus, so as to avert any echo phenomenon.

31. A structure according to claim 18, wherein the connection channel for connection with the external bus is supplied either by one of the devices or by the external bus by a set of diodes associated in an OR gate, to the input of which there are applied all the supply voltages given by the channels.

32. A structure according to claim 18, wherein the signals exchanged with the device enable the supply of the bidirectional channel, the at least one connection channel and the external bus.

33. A structure according to claim 18, wherein each bidirectional connection channel for the connection of a device comprises a mechanism configured to simultaneously receive signals that it has just transmitted on the local bus.

34. A structure according to claim 18, comprising a second local bus coupled to the first local bus, by a repeater so as to appear as a single local bus for all the connection channels of the connection structure.

35. A structure for the connection of a plurality of electronic devices to an ARINC (Aeronautical Radio, Inc.) type external bus, said structure comprising:

a local bus with a sufficiently small length to overcome phenomena of attenuation and propagation time;

a bidirectional connection channel for connecting each of the electronic devices located in one and the same zone to the local bus; and at least one connection channel for connecting the local bus to the external bus, wherein each connection channel of the electronic devices comprises:

means for permitting transmission on the local bus only when all other channels are inactive;

a transmitter/receiver stage that is supplied by the device and is connected directly to the local bus;

a logic stage that combines logic functions of the channel and is connected to the transmitter/receiver stage;

an analog stage that combines analog functions of the channel and is connected to the logic stage; and an isolating stage providing for electrical isolation between the electronic device and the analog stage, and wherein the logic stage of the connection channel for connection to the external bus comprises means for preventing signals transmitted by the external bus from being re-transmitted to the external bus, so as to avert any echo phenomenon.

36. A structure for the connection of a plurality of electronic devices to an ARINC (Aeronautical Radio, Inc.) type external bus, said structure comprising:

a local bus with a sufficiently small length to overcome phenomena of attenuation and propagation time;

a bidirectional connection channel configured to connect each of the devices located in one and the same zone to the local bus; and at least one connection channel configured to connect the local bus to the external bus, wherein each connection channel of the electronic devices comprises:

a mechanism configured to permit transmission on the local bus only when all other channels are inactive;

a transmitter/receiver stage that is supplied by the device and is connected directly to the local bus;

a logic stage that combines logic functions of the channel and is connected to the transmitter/receiver stage;

an analog stage that combines analog functions of the channel and is connected to the logic stage; and an isolating stage providing for electrical isolation between the electronic device and the analog stage, and wherein the logic stage of the connection channel for connection to the external bus comprises a logical gate configured to prevent the signals transmitted by the external bus from being re-transmitted to the external bus, so as to avert any echo phenomenon, a bidirectional connection channel for connecting each of the electronic devices located in one and the same zone to the local bus; and at least one connection channel for connecting the local bus to the external bus, wherein each connection channel of the electronic devices comprises means for permitting transmission on the local bus only when all other connection channels of the structure are inactive, wherein each connection channel of the structure comprises means for broadcasting information received thereon to all other connection channels of the structure without memorization and without internal frame information filtering, and wherein the plurality of electronic devices connected to the structure share the same collision domain.

* * * * *